US012644782B2

(12) United States Patent
Malvar et al.

(10) Patent No.: US 12,644,782 B2
(45) Date of Patent: Jun. 2, 2026

(54) METHOD FOR MEASURING HUMIDITY

(71) Applicant: ABB Schweiz AG, Baden (CH)

(72) Inventors: Jose Malvar, Bad Homburg (DE);
Dominik Hoegenauer, Frankfurt am
Main (DE); Anna Gutberlet, Werl
(DE); Carolin Seubert, Alzenau (DE);
Stefan Filip, Haibach (DE); **Stefan
Bleil**, Bad Homburg (DE)

(73) Assignee: ABB Schweiz AG, Baden (CH)

( * ) Notice: Subject to any disclaimer, the term of this
patent is extended or adjusted under 35
U.S.C. 154(b) by 734 days.

(21) Appl. No.: 17/953,934

(22) Filed: Sep. 27, 2022

(65) Prior Publication Data

US 2023/0094819 A1 Mar. 30, 2023

(30) Foreign Application Priority Data

Sep. 28, 2021 (EP) ..................................... 21199534

(51) Int. Cl.
G01K 15/00 (2006.01)
(52) U.S. Cl.
CPC ................................. G01K 15/005 (2013.01)
(58) Field of Classification Search
CPC .. G01N 25/58; G01N 33/006; G01N 33/0042;
G01K 15/005; F01N 11/00; F01N
2560/06; F01N 2560/028; F02D 41/1446;
F02D 2041/1472
See application file for complete search history.

(56) References Cited

U.S. PATENT DOCUMENTS

| | | | |
|---|---|---|---|
| 5,148,710 A | 9/1992 | Gudehus et al. | |
| 5,894,083 A | 4/1999 | Hiraoka et al. | |
| 6,022,138 A | 2/2000 | Sonander | |
| 2016/0003179 A1* | 1/2016 | Stellwagen | ......... F02B 29/0493 |
| | | | 60/599 |

(Continued)

FOREIGN PATENT DOCUMENTS

| | | |
|---|---|---|
| CN | 101641591 A | 2/2010 |
| CN | 202420945 | 9/2012 |
| CN | 110121613 A | 8/2019 |

(Continued)

OTHER PUBLICATIONS

Machine Translation of DE 102014218997 A1 (Year: 2015).*

(Continued)

*Primary Examiner* — Stephen D Meier
*Assistant Examiner* — Quang X Nguyen
(74) *Attorney, Agent, or Firm* — Fitch Even Tabin &
Flannery LLP

(57) ABSTRACT

A device and method for measuring humidity of a constant
flowing sample gas of a combustion process includes trans-
porting the sample gas at a specific temperature above the
dew point temperature to a cooling-region having a tem-
perature equal to or lower than a temperature at which water
in the sample gas condenses, cooling the sample gas in the
cooling-region to at least the condensation temperature, so
that water condenses, purging the condensate, determining
the temperature of a position in a condensation-region of the
cooling-region, and calculating the humidity content of the
sample gas based on the determined temperature using
calibration data.

10 Claims, 2 Drawing Sheets

(56)                   References Cited

U.S. PATENT DOCUMENTS

2021/0003103 A1*   1/2021   Singh ..................... F02M 26/36

FOREIGN PATENT DOCUMENTS

| | | | |
|----|----|----|----|
| CN | 112378956 | A | 2/2021 |
| DE | 4433451 | A1 | 3/1996 |
| DE | 102009053022 | A1 | 5/2011 |
| DE | 102014218997 | A1 | 3/2015 |
| DE | 102017216992 | A1 | 3/2019 |
| EP | 0703441 | A1 | 3/1996 |
| EP | 1837646 | A1 | 9/2007 |
| WO | WO 94/14055 | A1 | 6/1994 |

OTHER PUBLICATIONS

Machine Translation of Eraslan et al. DE102017216992A1 (Year: 2019).*

The Patent Office of the People's Republic of China, Office Action in Chinese Patent Application No. 202211129363.6, 13 pp. (Mar. 17, 2025).

European Patent Office, Extended European Search Report in European Patent Application No. 21199534.5, 10 pp. (Mar. 23, 2022).

* cited by examiner

METHOD FOR MEASURING HUMIDITY

CROSS-REFERENCE TO RELATED APPLICATIONS

This patent application claims priority to European Patent Application No. 21199534.5, filed on Sep. 28, 2021, which is incorporated herein in its entirety by reference.

FIELD OF THE DISCLOSURE

The present disclosure to a device and method for measuring the humidity of a sample gas.

BACKGROUND OF THE INVENTION

In combustion processes, the emissions released with the exhaust gas often have to be checked regularly by means of an emission measurement. For this purpose, a fraction of the exhaust gas is discharged as a sample. Due to the high exhaust gas temperature, the exhaust gas sample is fed to a cooler before the actual exhaust gas is measured. In this cooler, the water contained in the exhaust gas condenses and is discharged. However, in many cases emission components dissolved in the water are discharged with the water, so that the substances measured in the exhaust gas measurement are lower. The level of dissolved components is proportional to the amount of water.

However, based on the humidity of the exhaust gas, it is possible to calculate the resulting amount of condensate. To determine the moisture in the exhaust gas, a moisture sensor is provided in the exhaust gas discharged as a sample. Due to the corrosive nature of the exhaust gas, the use of conventional measuring sensors is very complex and disproportionately expensive.

Reference WO 94/14055 discloses an apparatus for the continuous monitoring of humidity of a gas or atmospheric air, which comprises, in combination, a fast response humidity sensor and a cycling chilled mirror type sensor which provide respective readings to a data processor. At each dew point determination by the cycling chilled mirror sensor the calibration of the fast response sensor is checked and if necessary corrected. Between dew point samplings by the chilled mirror sensor, the processor provides an output, significant of humidity, which is based on the signal from the fast response sensor taking into account the most recently established calibration of the fast response sensor by reference to the chilled mirror sensor.

BRIEF SUMMARY OF THE INVENTION

In a general aspect, the present disclosure describes a device and method for measuring the humidity of a gas, with which the humidity can be measured in an easy and economical way. In another aspect, the disclosure describes a humidity-measuring device for conducting this measurement.

The disclosure describes a method for measuring the humidity of a constant flowing sample gas of a combustion process. In order to achieve reproducible humidity results the flow rate is constant during the measurement. In a first step of the method, the sample gas is transported at a specific temperature above the dew point temperature to a cooling-region having a temperature equal to or lower than a temperature at which water in the sample gas condenses. The specific temperature for the method is a fixed temperature, which has to be constant during the measurement. A cooling-region according to the invention is a region where the gas is cooled to at least the condensation temperature in order to condensate water in the sample gas. This could be e.g. a region of a pipe where the gas is transported or a specific region in a device.

In a next step, the sample gas is cooled in the cooling-region to at least the condensation temperature, so that water condenses and the condensate is purged. The condensation temperature thereby is chosen to mainly condensate the water vapor in the sample gas. Further, the temperature of a position in a condensation-region of the cooling-region is determined. In other words, the condensation-region is a region inside the cooling-region. In the condensation region the water in the sample gas condenses. The position of which the temperature is determined thereby is inside the condensation-region. Although, the temperature of a position in the condensation region is determined, the temperature measuring device needs not to be at this position. By determining the temperature of a position in the condensation-region it is possible to deduce the humidity of the sample gas. In other words, if the humidity content vary, also the determined temperature at this position vary respectively.

In a next step, the humidity content of the sample gas is calculated based on the determined temperature using calibration data. The calibration data provides a correlation between the determined temperature and the humidity content of the gas at different specific temperatures at the position in the condensation region. The humidity therefore can be measured merely by determining the temperature. In contrast to a direct humidity measurement the temperature measurement is easy and more economically than the humidity measurement. Based on the humidity also the amount of condensate and therewith the amount of SO2 solved in the condensate can be calculated. A measured SO2 content then can be corrected by the amount of SO2 purged with the condensate.

BRIEF DESCRIPTION OF THE SEVERAL VIEWS OF THE DRAWING(S)

DETAILED DESCRIPTION OF THE INVENTION

Figure 1:
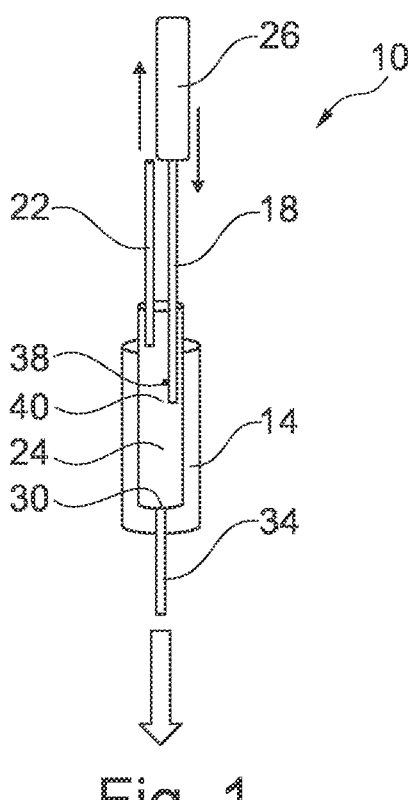
FIG. 1 is an outline view of a first embodiment of a humidity-measuring device in accordance with the disclosure.

FIG. 1 shows a first embodiment of a humidity-measuring device 10 according to the present invention. The humidity-measuring device 10 according to an embodiment of the invention comprises a gas-cooling device 14 with a sample gas inlet-tube 18 and a sample gas outlet-tube 22. With the sample gas inlet-tube 18, the sample gas is introduced into the gas-cooling device 14. The gas-cooling device 14 has a cavity, which provides the cooling-region 24. The humidity-measuring device 10 further comprises a heater 26, which is arranged on the sample gas inlet-tube 18 for heating the sample gas to a specific temperature before introducing the sample gas into the gas-cooling device 14.

The gas-cooling device 14 has a temperature, so that the sample gas is cooled to or below the condensation temperature of the water in the sample gas. At a bottom of the gas-cooling device 14, a condensate outlet 30 is arranged for purging the condensate 34. In the gas-cooling device 14, a temperature measuring device 38 is provided for measuring the actual temperature of the gas. In this embodiment the temperature measuring device 38 is a temperature sensor The temperature sensor 38 thereby is arranged at a position, of a condensation-region 40, where condensation of the water occurs. In this example, the temperature sensor 38 is arranged in the region of the inlet tube 18. With the gas outlet tube 22, the gas is transported to a gas-measuring device (not shown) for measuring the emission components of the gas.

Figure 2:
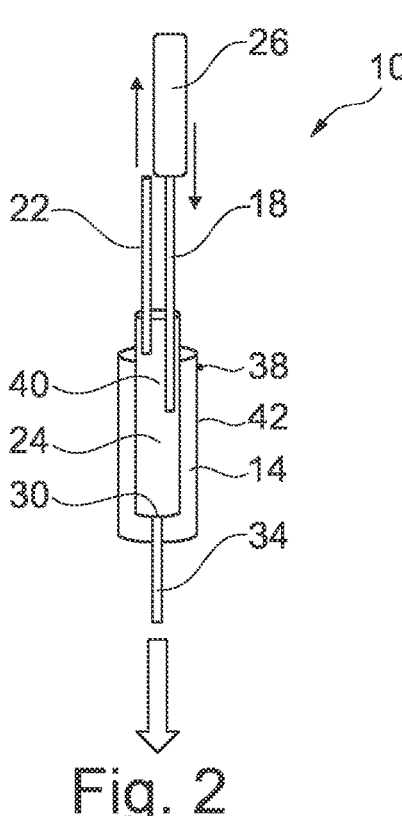
FIG. 2 is an outline view of a second embodiment of a humidity-measuring device in accordance with the disclosure.

In FIG. 2, a second embodiment of a humidity-measuring device 10 according to the present invention is shown. This embodiment differ to the first embodiment shown in FIG. 1, by the feature that the temperature sensor 38 is arranged at an external surface 42 of the gas-cooling device 14. With this arrangement, it can be avoided that the temperature sensor 38 has to be introduced into the gas-cooling device 14, so that the arrangement can be simplified.

Figure 3:
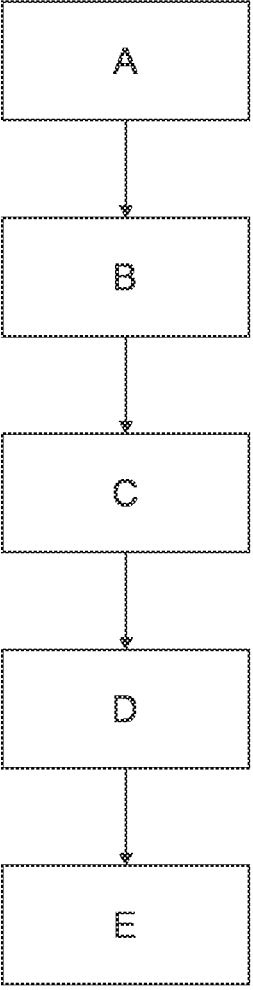
FIG. 3 is a flowchart for a method for measuring the humidity of a sample gas in accordance with the disclosure.

FIG. 3 shows a flowchart for an embodiment of a method for measuring the humidity of a sample gas. In a first step A of the method, the gas is heated to a specific temperature above the dew point, so that varying temperatures of the introduced gas do not influence the measured temperature. In a next step B, the gas is introduced into the gas-cooling device 14. In step C the sample gas is cooled to a temperature below the condensation temperature, so that the water in the gas condenses. The condensate 34 then is purged. After this, in step D, the temperature is measured. The position of the temperature sensor 38 thereby is a position in the condensation-region, where the temperature changes corresponds to the humidity content of the introduced gas. In Step E, the humidity content of the sample gas is calculated based on the measured temperature using calibration data. Based on this calculation also the amount of condensate 34 and the water-soluble gas component can be calculated.

In one embodiment, additionally to the determined temperature, the ambient temperature of the cooling-region is measured. The ambient temperature is the temperature of the ambient externally to the cooling region. This temperature has an effect on the determined temperature of the position in the condensation-region. In other words, varying ambient temperatures lead to different results. Although, this effect is small, by knowing this temperature the measuring accuracy can be improved.

In a further embodiment, the temperature is determined of a position, where the temperature change, corresponding to the humidity content of the introduced sample gas, is maximal. This position usually is found by using different positions for the e.g. temperature sensor. By using a position where the temperature change is maximal, also small temperature changes and therewith changes in the condensate amount can be detected. Accordingly, the accuracy of the measurement can further be improved.

Advantageously, the temperature is measured in the condensation-region. The temperature sensor thereby is directly provided at the position in the condensation-region. Calculations for thermal conductions through e.g. a housing wall can be omitted. Determination of temperature thereby is simplified. Further, the accuracy is improved, as calculation imprecisions are avoided. By measuring the temperature directly at the position, the influence of the ambient temperature on the measured temperature thereby is decreased. Accordingly, the measured temperature is more accurate.

Alternatively, the temperature of the condensation-region is determined externally thereto. In other words, the temperature sensor is not directly provided at the position in the condensation region. The temperature sensor can be provided on an e.g. surface of a housing. Thereby a respective channel used for guiding the temperature sensor into the housing is not necessary. This simplify temperature measurement. Further, in case of a temperature sensor malfunction, the temperature sensor can be exchanged more easily.

Preferably, an amount of a water-soluble gas component solved in the purged condensate is calculated based on a correlation function depending on the determined temperature. With this correlation function, it is possible to directly calculate the water-soluble gas component lost with the condensate by using the measured temperature. Determination of the soluble gas component thereby is simplified. The soluble gas component therefore can be calculated without calculating the amount of condensate.

In an embodiment, the initial content of the water-soluble gas component is calculated by adding a measured remaining content of the water-soluble gas component, downstream to the cooling-region, to a content in the purged condensate. With this calculation, the determination of the initial content of the water-soluble gas component is easily possible.

Advantageously, the gas upstream to the cooling-region is heated to the specific temperature. The gas condition therefore is kept on a reproducible level, so that the measuring accuracy is improved.

The present disclosure is further directed to a humidity-measuring device for conducting the method according to the above disclosure. The humidity measuring device comprises a cooling-region for cooling the sample gas to a temperature equal to or lower than a temperature, at which water in the sample gas condensate, and a temperature measuring device, for measuring the temperature of the condensation region. With such a humidity-measuring device, the advantages describe above can be achieved.

In an embodiment, a heater is arranged upstream to the cooling-region for heating the gas to the specific temperature. With this heater it is avoided that the gas condenses at a stage before the cooling-region. Further, the measuring accuracy is improved, as the gas is provided with a high reproducibility.

In another embodiment, the cooling-region is provided inside a cooling-device. Such a cooling-device merely is provided to cool the sample gas, so that the humidity of the sample gas can be determined. Such a cooling device therefore does not provide further component parts having a negative effect on the measurement result. Accordingly, the humidity content can be measured with a high accuracy.

These and other features, aspects and advantages of the present invention will become better understood with reference to the accompanying figure and the following description. Identical or equivalent elements are in principle provided with the same reference signs.

LIST OF REFERENCE NUMBERS

10 humidity-measuring device
14 gas-cooling device
18 gas inlet-tube
22 gas outlet-tube
24 cooling-region
26 heater
30 condensate outlet
34 condensate
38 temperature sensor
40 condensation-region 42 external surface A step B step C step D step E step All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for measuring a humidity content of a sample gas of a combustion process that is constantly flowing, the method comprising:

transporting the sample gas at a specific temperature above a dew point temperature to a cooling-region having a temperature equal to or lower than a temperature at which water in the sample gas condenses;

cooling the sample gas in the cooling-region to at least the condensation temperature, so that water condenses;

purging the condensed water via a condensate outlet of the cooling-region absent heating and/or evaporating of the condensed water;

determining a temperature of a position in a condensation-region of the cooling-region; and calculating the humidity content of the sample gas based on the temperature of the position in the condensation-region of the cooling-region using calibration data.

2. The method according to claim 1, further comprising measuring an ambient temperature of the cooling-region in addition to the determined temperature.

3. The method according to claim 1, wherein the temperature determined in the condensation-region is measured at a position in which a temperature change, corresponding to the humidity content of the introduced sample gas, is maximal.

4. The method according to claim 1, wherein the temperature is measured in the condensation-region.

5. The method according to claim 1, wherein the temperature of the condensation-region is determined externally thereto.

6. The method according to claim 1, wherein an amount of a water-soluble gas component solved in the condensate that is purged is calculated based on a correlation function depending on the determined temperature.

7. The method according to claim 1, further comprising heating the sample gas to the specific temperature at a location upstream to the cooling-region.

8. A humidity-measuring device for measuring a humidity content of a sample gas flow, comprising:

a controller;

a cooling-region configured to cool the sample gas to a temperature equal to or lower than a temperature at which water in the sample gas condenses, the cooling-region including a condensation-region; and a temperature measuring device associated with the controller and disposed to measure a temperature at a location along the condensation-region;

wherein, during operation, the humidity-measuring device operates to:

transport the sample gas at a specific temperature above a dew point temperature to the cooling-region having a temperature equal to or lower than a temperature at which water in the sample gas condenses;

cool the sample gas in the cooling-region to at least the condensation temperature, so that water condenses;

purge the condensed water via a condensate outlet of the cooling-region absent heating and/or evaporating of the condensed water;

determine a temperature of a position in a condensation-region of the cooling-region; and use the controller to calculate the humidity content of the sample gas based on the temperature of the position in the condensation-region of the cooling-region using calibration data.

9. The humidity-measuring device according to claim 8, further comprising a heater arranged upstream to the cooling-region and configured to heat the sample gas to the specific temperature.

10. The humidity-measuring device according to claim 8, wherein the cooling-region is defined within a cooling device.

* * * * *